Patented Jan. 15, 1929.

1,699,254

UNITED STATES PATENT OFFICE.

ERNST SCHWARZ, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MIXED FERTILIZER.

No Drawing. Application filed January 15, 1926, Serial No. 81,545, and in Germany January 19, 1925.

A mixed fertilizer of great utility consisting of a mixture of urea, ammonium phosphate and potassium nitrate or sulfate or both nitrate and sulfate of potassium, is described in my copending application for patent Serial No. 20,546, filed April 3, 1925.

I have now found that it is often advantageous to replace the ammonium phosphate in the said fertilizer wholly or partly by di-calcium phosphate. Thereby the storage of the fertilizer is considerably improved. Though the mixed fertilizer is not completely soluble in water, the insoluble compound, di-calcium phosphate, contains the phosphoric acid in a highly efficient citrate-soluble form. Its calcium content is also a plant nutrient and in addition the new mixture has the advantage that the difficultly soluble di-calcium phosphate forms a valuable buffer-compound regulating the reaction of the soil without introducing any useless ballast substances into the fertilizer. The potassium may be present in the form of any suitable fertilizing salt, for example as a high per cent potassium chlorid. However, I prefer to employ potassium nitrate or sulfate or a mixture thereof.

The new fertilizer is especially advantageous for light soils. The proportions of the several compounds may be so chosen as to have the chief nutrients $K_2O$, N and $P_2O_5$ present in the mixture in a reasonable proportion, preferably of 1 part of nitrogen to 1 to 4 parts of $P_2O_5$ to 1 to 3 parts of $K_2O$, but other proportions may also be employed.

The following examples will further illustrate my invention which, however, is not limited to these examples. The parts are by weight.

Example 1.

The mixture consists of 30 parts of potassium sulfate, 37 parts of di-calcium phosphate and 33 parts of urea. The fertilizer contains about 15.2 per cent of each, nitrogen, $P_2O_5$ and $K_2O$.

Example 2.

Mix 40 parts of potassium nitrate, 17 parts of ammonium phosphate, 23 parts of di-calcium phosphate and 20 parts of urea. The mixture contains about 18.4 per cent of each, nitrogen $P_2O_5$ and $K_2O$. The proportions of these nutrients must not be equal.

Example 3.

Mix 51 parts of potassium sulfate, 26 parts of di-calcium phosphate and 25 parts of urea. The mixture contains 10 per cent of each, nitrogen and $P_2O_5$, and 25 per cent of $K_2O$.

Example 4.

15 parts of potassium sulfate, 68 parts of di-calcium phosphate and 17 parts of urea are mixed with each other. The fertilizer contains 8 per cent of nitrogen, 27 per cent of $P_2O_5$ and 8 per cent of $K_2O$.

I claim:

1. A mixed fertilizer comprising urea, di-calcium phosphate and a fertilizing potassium salt.

2. A mixed fertilizer comprising urea, di-calcium phosphate and a potassium salt selected from the group consisting of potassium nitrate and sulfate.

3. A mixed fertilizer comprising urea, di-calcium phosphate and potassium nitrate.

4. A mixed fertilizer comprising urea, di-calcium phosphate, ammonium phosphate and a fertilizing potassium salt.

5. A mixed fertilizer comprising urea, di-calcium phosphate and ammonium phosphate and a potassium salt selected from the group consisting of potassium nitrate and sulfate.

6. A mixed fertilizer comprising urea, di-calcium phosphate and a fertilizing potassium salt and containing N, $P_2O_5$ and $K_2O$ in about the proportion of 1:1 to 4:1 to 3.

7. A mixed fertilizer comprising urea, di-calcium phosphate and a potassium salt selected from the group consisting of potassium nitrate and sulfate, and containing N, $P_2O_5$ and $K_2O$ in about the proportion of 1:1 to 4:1 to 3.

8. A mixed fertilizer comprising urea, di-calcium phosphate and potassium nitrate and containing N, $P_2O_5$ and $K_2O$ in about the proportion of 1:1 to 4:1 to 3.

9. A mixed fertilizer comprising urea, di-calcium phosphate and ammonium phosphate and a potassium salt selected from the group consisting of potassium nitrate and sulfate and containing N, $P_2O_5$ and $K_2O$ in about the proportion of 1:1 to 4:1 to 3.

In testimony whereof I have hereunto set my hand.

ERNST SCHWARZ.